United States Patent
Asano et al.

(12) 
(10) Patent No.: US 11,731,572 B2
(45) Date of Patent: Aug. 22, 2023

(54) ELECTRICAL JUNCTION BOX

(71) Applicant: Sumitomo Wiring Systems, Ltd., Yokkaichi (JP)

(72) Inventors: Ayaka Asano, Yokkaichi (JP); Kazuya Komaki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 422 days.

(21) Appl. No.: 17/030,608

(22) Filed: Sep. 24, 2020

(65) Prior Publication Data

US 2021/0086710 A1    Mar. 25, 2021

(30) Foreign Application Priority Data

Sep. 25, 2019   (JP) ................................. 2019-174555

(51) Int. Cl.
*H02G 3/08* (2006.01)
*B60R 16/03* (2006.01)

(52) U.S. Cl.
CPC ............ *B60R 16/03* (2013.01); *H02G 3/081* (2013.01)

(58) Field of Classification Search
CPC .......... H02G 3/08; H02G 3/081; H02G 3/088; H02G 3/16; H02G 3/14; B60R 16/03; B60R 16/00; B60R 16/02; B60R 16/0238; H05K 5/00; H05K 5/02
USPC ................. 174/50, 535, 520, 541, 542, 559; 220/3.2, 3.3, 4.02; 361/600, 601, 605, 361/641, 659, 679.01
See application file for complete search history.

(56) References Cited

U.S. PATENT DOCUMENTS

| | | | | |
|---|---|---|---|---|
| 7,465,172 B2* | 12/2008 | Ishiguro | ................. | H05K 7/026 174/50 |
| 7,717,720 B2* | 5/2010 | Ikeda | .................... | H01H 50/048 439/701 |
| 8,690,588 B2* | 4/2014 | Jetton | ................. | B60R 16/0238 439/948 |
| 8,887,934 B2* | 11/2014 | Akahori | ............. | B60R 16/0238 220/3.8 |
| 10,727,659 B2* | 7/2020 | Hasegawa | ........... | B60R 16/0238 |

FOREIGN PATENT DOCUMENTS

| | | | |
|---|---|---|---|
| JP | 2016-025736 A | | 2/2016 |
| JP | 2019050660 A | * | 3/2019 |

* cited by examiner

*Primary Examiner* — Angel R Estrada
(74) *Attorney, Agent, or Firm* — Honigman LLP (57) ABSTRACT

Provided is an electrical junction box capable of housing an electric component while absorbing the tolerance of the electric component. The electrical junction box is an electrical junction box that is to be mounted in a vehicle, including: a casing that forms an outer shell; and a fixation member that fixes, to the casing, an electric component that is to be electrically connected to a vehicle-mounted load or an electricity storage device mounted in the vehicle, wherein a slit for absorbing a tolerance associated with external dimensions of the electric component is provided in the fixation member.

8 Claims, 6 Drawing Sheets

ELECTRICAL JUNCTION BOX

CROSS-REFERENCE TO RELATED APPLICATIONS

This application claims priority of Japanese Patent Application No. JP 2019-174555 filed on Sep. 25, 2019, the contents of which are incorporated herein.

TECHNICAL FIELD

The present disclosure relates to an electrical junction box.

BACKGROUND

Wires that are mounted in a vehicle and supply power from a vehicle-mounted battery to vehicle-mounted loads in the vehicle are temporarily connected to an electrical junction box, and are connected to the respective vehicle-mounted loads via the electrical junction box (e.g., JP 2016-25736A). The electrical junction box described in JP 2016-25736A includes a relay and a box body to which the relay is fixed.

SUMMARY

However, while an electric component such as a relay that is housed in an electrical junction box has a tolerance in its external dimensions, the electrical junction box described in JP 2016-25736A has a problem in that such a tolerance has not been taken into consideration for the box body to which the relay is fixed.

It is an object of the present disclosure to provide an electrical junction box capable of housing an electric component while absorbing the tolerance thereof, even if the electric component to be housed therein has a tolerance.

An electrical junction box according to an aspect of the present disclosure is an electrical junction box that is to be mounted in a vehicle. The electrical junction box includes a casing that forms an outer shell; and a fixation member that fixes, to the casing, an electric component that is to be electrically connected to a vehicle-mounted load or an electricity storage device mounted in the vehicle, wherein a slit for absorbing a tolerance associated with external dimensions of the electric component is provided in the fixation member.

According to an aspect of the present disclosure, it is possible to provide an electrical junction box capable of housing an electric component while absorbing a tolerance thereof.

DETAILED DESCRIPTION OF PREFERRED EMBODIMENTS

First, aspects of the present disclosure will be listed and described. At least some of the aspects described below may be combined as appropriate.

An electrical junction box according to an aspect of the present disclosure is an electrical junction box that is to be mounted in a vehicle. The electrical junction box includes a casing that forms an outer shell; and a fixation member that fixes, to the casing, an electric component that is to be electrically connected to a vehicle-mounted load or an electricity storage device mounted in the vehicle, wherein a slit for absorbing a tolerance associated with external dimensions of the electric component is provided in the fixation member.

According to the present aspect, a slit for absorbing a tolerance associated with the external dimensions of an electric component is formed in the fixation member that fixes the electric component to the casing. The fixation member allows variations in external dimensions due to the tolerance of the electric component within the range of elastic deformation at a portion in which the slit is provided, and thus can reliably fix the electric component to the casing.

In an electrical junction box according to an aspect of the present disclosure, the fixation member includes a plurality of wall members provided surrounding at least a portion of an outer peripheral surface of the electric component, and the slit is provided in one wall member of the plurality of wall members.

According to the present aspect, the plurality of wall members included in the fixation member are provided surrounding at least a portion of the outer peripheral surface of the electric component, and it is therefore possible to surround the electric component by the plurality of wall members, and efficiently fix the electric component to the casing. Since the slit is provided in one wall member of the plurality of wall members, it is possible to easily form a structure for absorbing the tolerance associated with the external dimensions of the electric component.

In an electrical junction box according to an aspect of the present disclosure, the fixation member includes a fastening portion that fastens the electric component, the slit is provided in each of adjacent two wall members of the plurality of wall members, and the fastening portion is provided at a corner portion formed by the adjacent two wall members.

According to the present aspect, the fastening portion included in the fixation member is provided at a corner portion formed by two adjacent wall members, and the slit is provided in each of the two wall members. Accordingly, when an electric component is fastened to the fastening portion provided at the corner portion, the fixation member can fix the electric component to the casing, while absorbing the tolerance of the electric component, using the slit provided in each of the two wall members corresponding to the fastening portion.

In an electrical junction box according to an aspect of the present disclosure, a rib extending along the slit is provided on a surface of the wall member in which the slit is provided, on the electric component side, and the rib extending along the slit comes into contact with the outer peripheral surface of the electric component.

According to the present aspect, along the slit provided in the wall member, the rib provided on a surface of the wall member on the electric component side comes into contact with the outer peripheral surface of the electric component, and functions as a retaining member for the electric component. Accordingly, even in a state in which the electric component is displaced, for example, as a result of the portion where the rib is provided being bent due to the tolerance of the external dimensions of the electric component, it is possible to hold the electric component by the rib extending along the slit, and suppress the vibration of the electric component, for example, when the vehicle is traveling.

In an electrical junction box according to an aspect of the present disclosure, a reinforcing portion that covers a portion of the slit is provided on a surface of the wall member in which the slit is provided, on a side opposite to the electric component.

According to the present aspect, a reinforcing portion that covers a portion of the slit is provided on a surface of the wall member on a side opposite to the electric component, and it is therefore possible to increase the rigidity of the wall member at a portion in which the slit is provided.

In an electrical junction box according to an aspect of the present disclosure, the casing includes a box member having an opening, and the plurality of wall members are inner walls provided inside the box member.

According to the present aspect, the wall members of the fixation member are inner walls provided inside the box member, and it is therefore possible to increase the rigidity of the box member using the wall members that are inner walls, and fix the electric component to the casing using the inner walls.

Specific examples of an electrical junction box 1 according to embodiments of the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Figure 1:
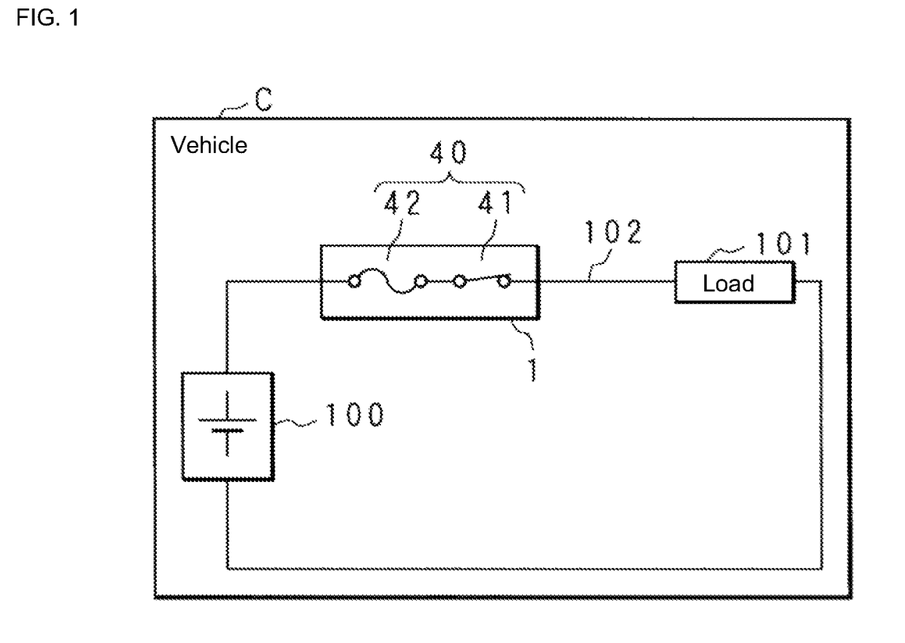
FIG. 1 is a schematic diagram showing a vehicle in which an electrical junction box according to Embodiment 1 is mounted.

FIG. 1 is a schematic diagram showing a vehicle C in which an electrical junction box 1 according to Embodiment 1 is mounted. The electrical junction box 1 in the present embodiment is mounted in the vehicle C, and is interposed between an electricity storage device 100 and a vehicle-mounted load 101 that are also mounted in the vehicle C. The electricity storage device 100 and the vehicle-mounted load 101 are electrically connected to each other with a wire 102 via the electrical junction box 1.

Although one vehicle-mounted load 101 is described in the present embodiment, the number of vehicle-mounted loads 101 is not limited to one. A plurality of vehicle-mounted loads 101 may be mounted in the vehicle C, and it is possible to adopt a configuration in which a branching portion is provided between the electrical junction box 1 and the plurality of vehicle-mounted loads 101, the wire 102 connected to a positive electrode of the electricity storage device 100 is branched by the branching portion, and the branched wires 102 are connected to the respective corresponding ones of the plurality of vehicle-mounted loads 101.

Although the electrical junction box 1 is connected to the positive electrode side of the electricity storage device 100 in the present embodiment, the present disclosure is not limited thereto. The electrical junction box 1 may be connected to the negative electrode side of the electricity storage device 100. Alternatively, the electrical junction box 1 may be connected to each of the positive electrode side and the negative electrode of the electricity storage device 100.

The electricity storage device 100 is, for example, an electric vehicle (EV) high-voltage battery such as a lead battery or a lithium ion battery.

The electrical junction box 1 houses an electric component 40. The electric component 40 includes a fuse 42 and a relay 41, for example. The relay 41 may be a mechanical relay or a semiconductor relay. The fuse 42 and the relay 41 included in the electric component 40 are connected to each other by a bus bar or the like, and constitute a series circuit. The relay 41 is communicably connected via a signal line to a power control system ECU (not shown) mounted in the vehicle C, and is turned on or off according to a signal that is output from the ECU.

Figure 2:
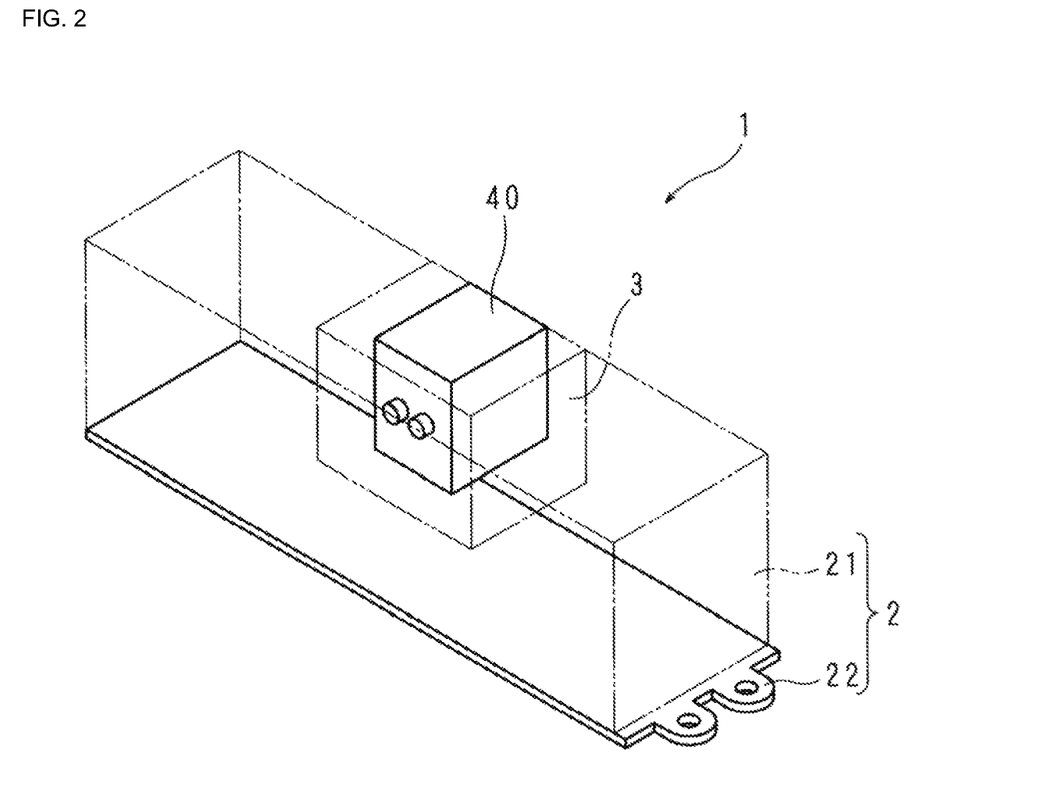
FIG. 2 is a perspective view schematically showing an external appearance of the electrical junction box.

FIG. 2 is a perspective view schematically showing an external appearance of the electrical junction box 1. The electrical junction box 1 includes a casing 2 that forms an outer shell. The casing 2 forms a rectangular solid made of an insulating resin, and includes an upper case 21 and a lower case.

The upper case 21 forms a box member having an opening. Although the details will be described later, a fixation member 3 is provided inward of the upper case 21, and an electric component 40 such as a relay 41 is fixed to the fixation member 3, for example.

The lower case forms, for example, a plate-shaped or dish-shaped lid member, and is provided so as to close the opening of the upper case 21.

The casing 2 that forms an outer shell of the electrical junction box 1 is formed as a result of the lower case being engaged with the opening of the upper case 21. The electrical junction box 1 formed in this manner is placed, for example, in the vicinity of the electricity storage device 100.

Figure 3:
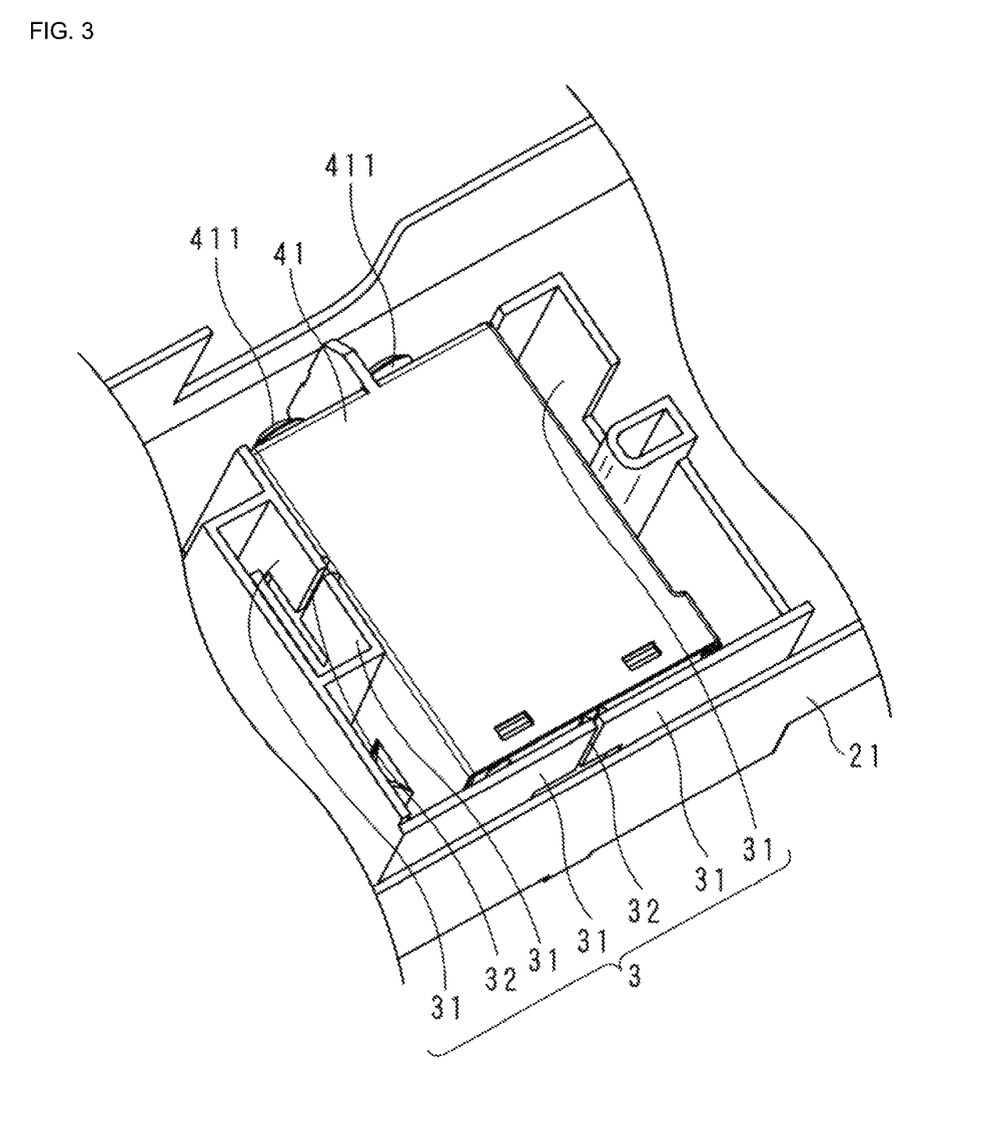
FIG. 3 is a perspective view of a fixation member in a state in which a relay is fixed, as viewed from the lower case side.
Figure 4:
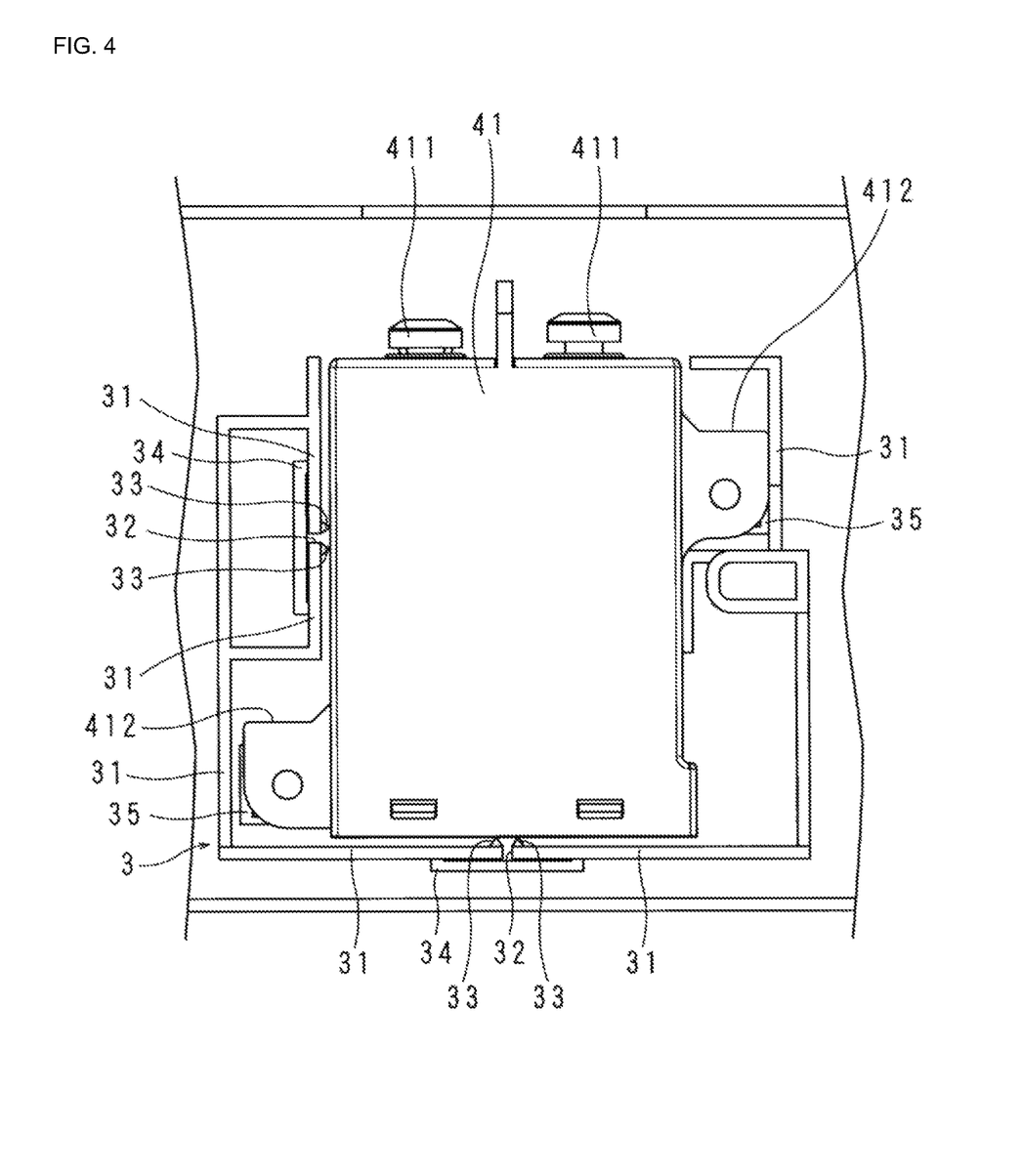
FIG. 4 is a plan view of the fixation member in a state in which the relay is fixed, as viewed from the lower case side.
Figure 5:
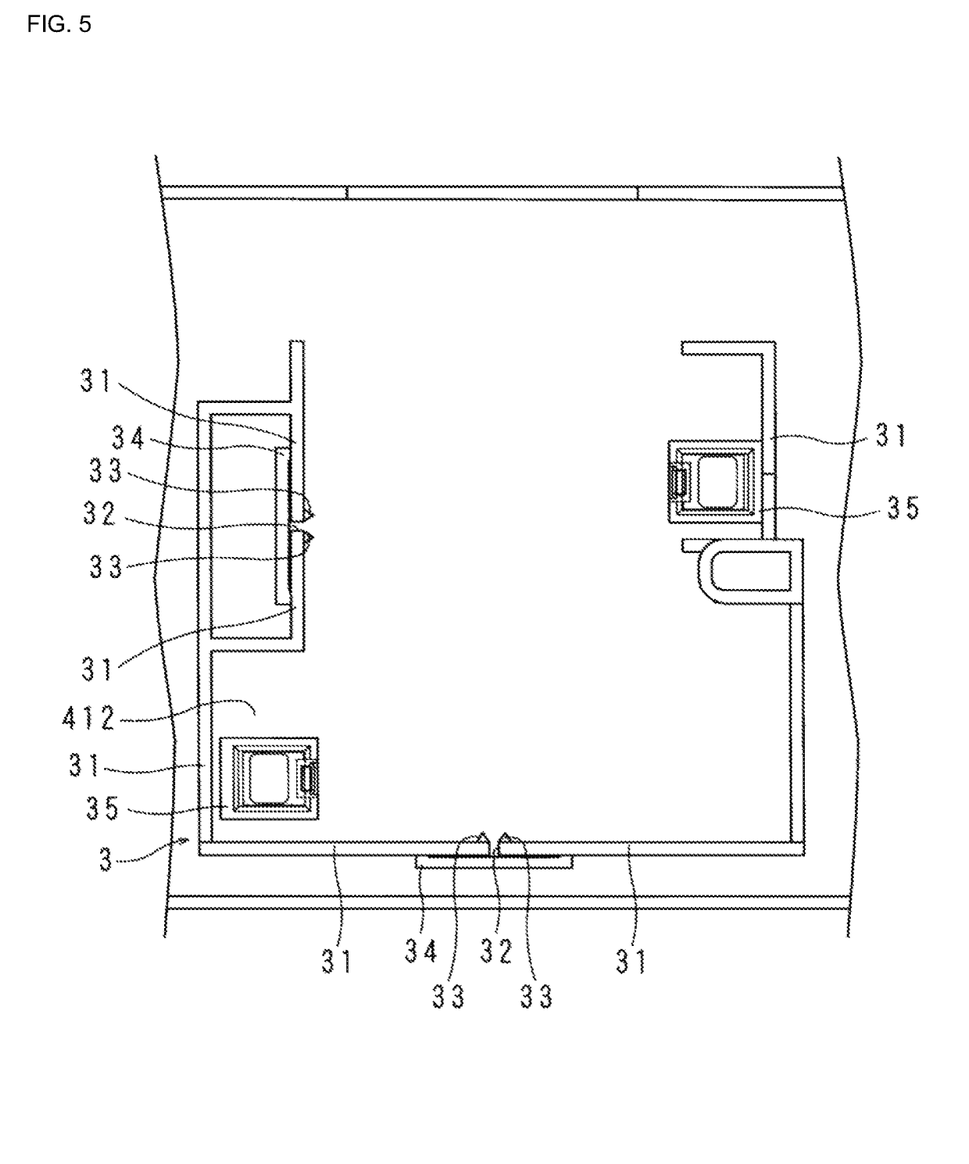
FIG. 5 is a plan view of the fixation member in a state in which the relay is removed, as viewed from the lower case side.

FIG. 3 is a perspective view of the fixation member 3 in a state in which the relay 41 is fixed, as viewed from the lower case side. FIG. 4 is a plan view of the fixation member 3 in a state in which the relay 41 is fixed, as viewed from the lower case side. FIG. 5 is a plan view of the fixation member 3 in a state in which the relay 41 is removed, as viewed from the lower case side. FIGS. 3 and 4 show a state in which the lower case is disengaged from the opening of the upper case 21, and show the fixation member 3 and the relay 41 in the upper case 21, as viewed from the opening (the lower case side). FIG. 5 shows the fixation member 3 in the upper case 21 in a state in which the relay 41 is removed from the state shown in FIG. 4, as viewed from the opening (lower case side).

As described above, the upper case 21 forms a box member, and the fixation member 3 is provided inward of the upper case 21, or in other words, inside the box member. The relay 41 is fixed to the upper case 21 by the fixation member 3.

The relay 41 forms a rectangular solid. Terminals 411 on the positive electrode side and the negative electrode side (positive electrode-side terminal, negative electrode-side terminal) are provided side by side on one side surface of the relay 41. An insulating wall is provided protruding from the one side surface between the positive electrode-side terminal and the negative electrode-side terminal. As shown in FIG. 4, an attachment piece 412 for attaching the relay 41 to the fixation member 3 is provided on each of the two side surfaces adjacent to the one side surface on which the terminals 411 on the positive electrode side and the negative electrode side are provided.

Each attachment piece 412 is provided with a hole, and the relay 41 is fastened to the fixation member 3, for example, by inserting a bolt into the hole and a fastening portion 35, which will be described later, of the fixation member 3, and fastening the bolt with a nut.

The outer peripheral surface of the relay 41 is formed by the one side surface on which the terminals 411 on the positive electrode side and the negative electrode side are provided, the two side surfaces adjacent to the one side surface and on which the attachment pieces 412 are provided, and a side surface opposed to the one side surface (hereinafter referred to as the other side surface).

A cut-out portion or hole portion for routing the wires 102 connected to the terminals 411 on the positive electrode side and the negative electrode side may be provided on a side wall of the upper case 21 that is opposed to the one side surface on which the terminals 411 on the positive electrode side and the negative electrode side are provided. By providing a cut-out portion or the like on the side wall of the upper case 21, it is possible to pass the wires 102 through the cut-out portion or the like from the outside of the electrical junction box 1, and efficiently connect the wires 102 to the terminals 411 on the positive electrode side and the negative electrode side.

The fixation member 3 includes a plurality of wall members 31 and a fastening portion 35 for fixing the relay 41. The plurality of wall members 31 are provided protruding from the bottom surface of the upper case 21, and cover at least a portion of the outer peripheral surface of the relay 41. As described above, the outer peripheral surface of the relay 41 is formed by the one side surface on which the terminals 411 on the positive electrode side and the negative electrode side are provided, the two side surfaces adjacent to the one side surface, and the side surface (the other side surface) opposed to the one side surface. Each of the plurality of wall members 31 is provided so as to cover a portion of the outer peripheral surface that is formed by the side surfaces other than the one side surface on which the terminals 411 on the positive electrode side and the negative electrode side are provided.

Each of the wall members 31 provided so as to cover a portion of the outer peripheral surface that is formed by the other side surface and a side surface (the side surface located on the left side of the other side surface in FIG. 4) adjacent to the other side surface is provided with a slit 32. That is, a slit 32 is provided in each of the wall members 31 opposed to the other side surface and the wall member 31 opposed to the side surface adjacent to the other side surface.

The wall member 31 opposed to the other side surface forms a straight line in a plan view. The lateral length of the wall member 31 opposed to the other side surface is set to be longer than the lateral length of the other side surface. The lateral lengths of the wall member 31 and the other side surface are lengths in an extension direction extending parallel to the bottom surface of the upper case 21, and are shown as lengths in the left-right direction in FIG. 4.

The slit 32 of the wall member 31 opposed to the other side surface is provided at the central portion of the wall member 31. The slit 32 is formed extending toward the bottom surface of the upper case 21 from an end portion (protruding end) of the wall member 31 provided protruding from the bottom surface, with the bottom surface side of the upper case 21 as a proximal end portion. That is, the slit 32 is provided along the direction of a normal to the bottom surface of the upper case 21. The slit 32 may be configured such that the width of the slit 32 increases in a direction extending from the end portion of the wall member 31 toward the bottom surface (proximal end portion) of the upper case 21. That is, the width of a portion of the slit 32 that is formed on the end portion side of the wall member 31 may be smaller than the width of a portion of the slit 32 that is formed on the proximal end portion side of the wall member 31.

On the surface of the wall member 31 opposed to the other side surface on the relay 41 side, two ribs 33 are provided along the slit 32. Each of the two ribs 33 forms a triangular shape or a semicircular shape in a plan view, and is provided on the surface of the wall member 31 on the relay 41 side so as to form a protrusion along an edge portion formed by the slit 32.

The respective distal end portions of the two ribs 33 are abutted against the other side surface of the relay 41, whereby the tolerance associated with the external dimensions of the relay 41 in the longitudinal direction can be absorbed within the range of elastic deformation of the wall member 31 in which the slit 32 is provided, and the relay 41 can be reliably fixed to the upper case 21. Also, the relay 41 can be held using the elastic force resulting from bending of the wall member 31 in which the slit 32 is provided, thus making it possible to suppress the vibration of the relay 41. Each of the two ribs 33 is provided so as to be located at the central portion of the other side surface of the relay 41. Accordingly, it is possible to efficiently suppress the vibration of the relay 41.

On the wall member 31 opposed to the other side surface, a reinforcing plate 34 is provided on the surface on the side opposite to the relay 41. The reinforcing plate 34 forms a C-shape in a plan view, and is provided so as to cover the slit 32 provided in the wall member 31. The reinforcing plate 34 includes a longer side portion that forms a C-shape, and two shorter side portions located at opposite ends of the longer side portion, and is provided such that end portions of the two shorter side portions are fixed to the surface on the side opposite to the relay 41. With the reinforcing plate 34 configured in this manner, the rigidity of the wall member 31 can be ensured.

A wall member 31 (the wall member disposed on the side of the side surface located to the left of the other side surface in FIG. 4) opposed to the side surface adjacent to the other side surface forms a crank shape having two corner portions in a plan view. The wall member 31 (hereinafter referred to as the crank-shaped wall member 31) opposed to a side surface adjacent to the other side surface includes a first linear portion adjacent to the wall member 31 opposed to the other side surface, a second linear portion in which a slit 32 is formed, and a coupling portion that couples the first linear portion and the second linear portion. The two corner portions are respectively formed between the first linear portion and the coupling portion, and between the coupling portion and the second linear portion.

The first linear portion of the crank-shaped wall member 31 is provided so as to cover a fastening portion 35, which will be described later, and a side surface on which the fastening portion 35 is provided. The second linear portion of the crank-shaped wall member 31 is provided so as to be opposed to a portion of the side surface on which the fastening portion 35 is provided. The second linear portion of the crank-shaped wall member 31 is provided with a slit 32, ribs 33, and a reinforcing plate 34, as in the case of the wall member 31 opposed to the other side surface.

The ribs 33 provided on the second linear portion of the crank-shaped wall member 31 are abutted against the side surface on which an attachment piece 412 of the relay 41 is provided, whereby the tolerance associated with the external dimensions of the relay 41 in the transverse direction can be absorbed within the range of elastic deformation of the wall member 31 in which the slit 32 is provided, and the relay 41 can be reliably fixed to the upper case 21. Also, the relay 41 can be held using the elastic force resulting from bending of the wall member 31 in which the slit 32 is provided, thus making it possible to suppress the vibration of the relay 41.

A wall member 31 having an L-shape in a plan view may be joined to the crank-shaped wall member 31, and the L-shaped wall member 31, the coupling portion, and the second linear portion may form the shape of a rectangular hollow. By using the second linear portion in which the slit 32 is formed as a portion of the rectangular hollow-shaped wall member 31, the rigidity of the second linear portion can be further increased.

The fixation member 3 may include a wall member 31 disposed on the side of a side surface (the side surface located to the right of the other side surface in FIG. 4) on which the other attachment piece 412 is provided. The wall member 31 forms an L-shape, and is provided so as to be opposed to a portion of the side surface on which the attachment piece 412 is provided. The L-shaped wall member 31 is provided at a position located diagonally to a corner portion formed by the first linear portion of the crank-shaped wall member 31 and the wall member 31 opposed to the other side surface in the rectangular shape of the relay 41 in a plan view.

The fixation member 3 includes two fastening portions 35 for fixing the relay 41. The two fastening portions 35 respectively correspond to the attachment pieces 412 of the relay 41, and are provided such that the fastening portions 35 of the fixation member 3 are aligned with the respective corresponding attachment pieces 412 of the relay 41 when the relay 41 is fixed to the fixation member 3.

Of the two fastening portions 35, one fastening portion 35 is provided at the corner portion formed by the first linear portion of the crank-shaped wall member 31 and the wall member 31 opposed to the other side surface. The other fastening portion 35 is provided at a place located diagonally to the one fastening portion 35 in the rectangular shape of the relay 41 in a plan view.

The fixation member 3 may include a second rib formed on a surface of the wall member 31 that is different from the surface in which the slit 32 is provided. A second rib is formed on one of the wall members 31 on a surface or a portion thereof in which the slit 32 is not provided, and the distal end portion of the second rib is abutted against the outer peripheral surface of the relay 41, whereby the relay 41 can be more efficiently held by the ribs 33 formed along the slit 32 and the second rib. Also, using the position of the outer peripheral surface of the relay 41 against which the distal end portion of the second rib is abutted as the reference for the abutment surface, the positions of the slit 32 and the ribs 33 for absorbing the tolerance of the external dimensions of the relay 41 can be efficiently determined.

Figure 6:
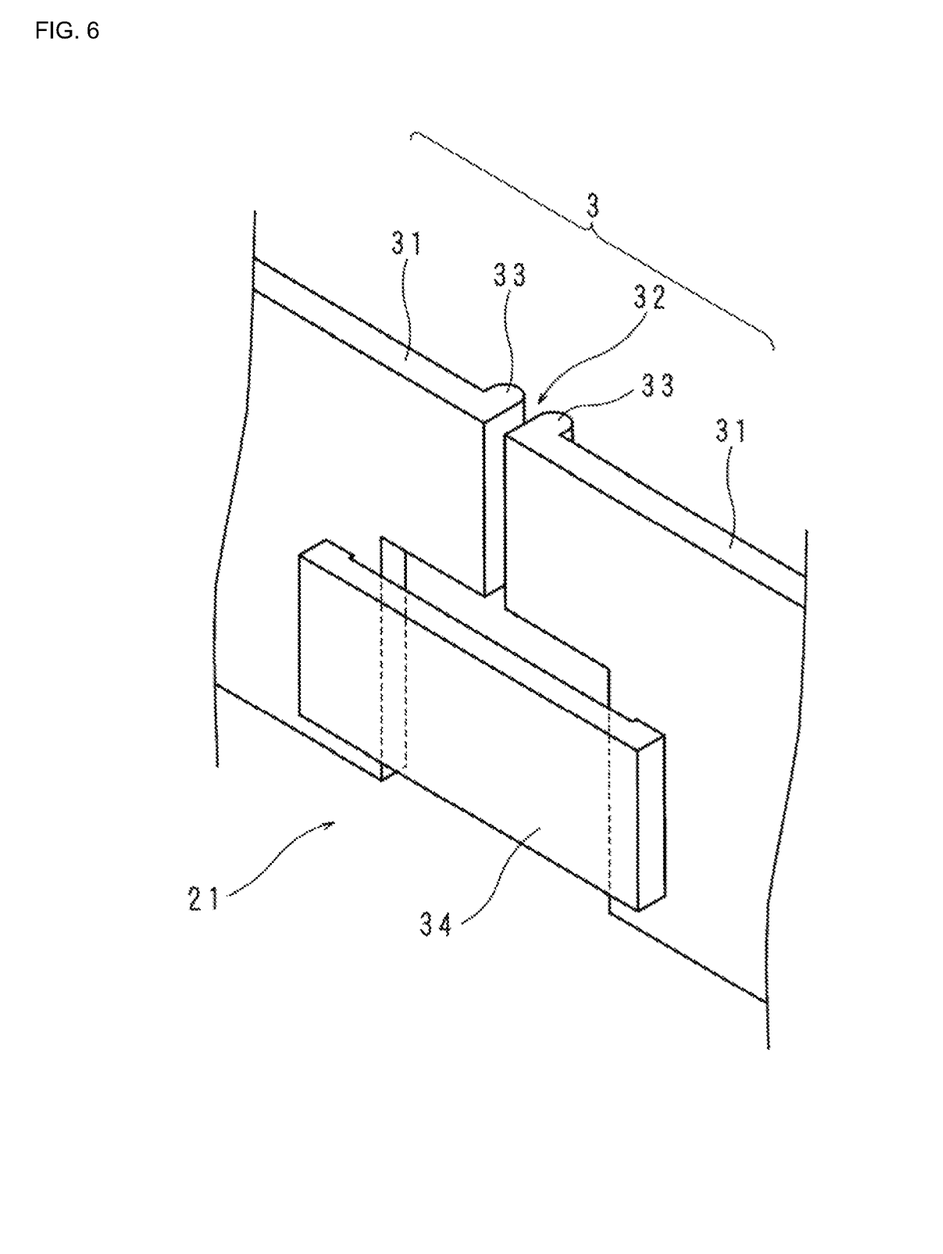
FIG. 6 is an enlarged explanatory diagram showing a portion where a slit is provided in the fixation member.

FIG. 6 is an enlarged explanatory diagram of a portion where the slit 32 is provided in the fixation member 3. As described above, a slit 32 is provided in each of the wall members 31 opposed to the other side surface, and the second linear portion of the crank-shaped wall member 31. Relevant portions of the fixation member 3 including the slits 32 will be described with reference to FIG. 6.

The wall member 31 of the fixation member 3 is provided protruding from the bottom surface of the upper case 21, and includes a proximal end portion on the bottom surface side, and an end portion serving as a protruding end. The slit 32 is formed extending from the end portion (protruding end) toward the proximal end portion, and the wall member 31 is divided by the slit 32. Alternatively, configurations are also possible in which the slit 32 does not reach the bottom surface of the upper case 21 from the end portion, and the wall member 31 has on the proximal end portion side, the remainder in which the slit 32 is not formed.

The slit 32 is formed such that the width thereof on the proximal end portion side is wider than the width thereof on the end portion side. That is, the slit 32 includes a narrower slit 32 provided on the end portion side, and a wider slit 32 provided on the proximal end portion side.

A reinforcing plate 34 is provided so as to cover the slit 32 on the proximal end portion side. As described above, the reinforcing plate 34 forms a C-shape in a plan view, and includes a longer side portion that forms the C-shape, and two shorter side portions located at opposite ends of the longer side portion. The reinforcing plate 34 is provided such that the longitudinal direction of each of the two shorter side portions extends along an edge portion of the wall member 31 that is formed by the slit 32, and the respective end portions of the two shorter side portions are fixed to a surface on the side opposite to the surface on which the ribs 33 are provided.

The reinforcing plate 34 is provided so as to cover the wider slit 32 provided on the proximal end portion side, and thus can complement a missing portion of the wall member 31 that has been caused by formation of the slit 32, and increase the rigidity of the wall member 31. In addition, the reinforcing plate 34 does not cover the narrower slit 32 provided on the end portion side, and thus can suppress the reduction in elasticity of the wall member 31 that can be exerted by the narrower slit 32.

Along the narrower slit 32 provided on the end portion side, two ribs 33 are formed on a surface on the side opposite to the surface on which the reinforcing plate 34 is provided. Each of the two ribs 33 forms a triangular shape or a semicircular shape in a plan view, and is provided so as to form a protrusion along an edge portion formed by the slit 32 on the surface on the side opposite to the surface on which the reinforcing plate 34 is provided, or in other words, the surface on which the relay 41 is disposed.

As shown in FIG. 4, the distal end portions of the two ribs 33 provided along the slit 32 abut against one of the side surfaces constituting the outer peripheral surface of the relay 41. Accordingly, it is possible to hold the relay 41 while absorbing the tolerance of the external dimensions of the relay 41 within the range of elastic deformation resulting from bending of the wall member 31 in which the slit 32 is provided, and also to suppress the vibration of the relay 41 when the vehicle C is traveling, for example.

As described above, the fixation member 3 includes one fastening portion 35, and another fastening portion 35 located diagonally to the one fastening portion 35. The attachment pieces 412 of the relay 41 are aligned with the fastening portions 35, and the relay 41 is fixed to the fixation member 3 by inserting, for example, bolts into holes provided in the attachment pieces 412 and the fastening portions 35, and fastening the bolts with nuts. The one fastening portion 35 is provided at a corner portion formed by the first linear portion of the crank-shaped wall member 31 and the wall member 31 opposed to the other side surface, and the slits 32 are provided in the first linear portion of the crank-shaped wall member 31 and the wall member 31 opposed to the other side surface. Although a fixed end is formed by fastening an attachment piece 412 of the relay 41 to the other fastening portion 35, the one fastening portion 35 to which the other attachment piece 412 is fastened is located at a corner portion formed by the adjacent wall members 31 in which the slits 32 are formed, and the tolerance associated with the external dimensions of the relay 41 can be absorbed by the respective slits 32 of the adjacent wall members 31. Accordingly, when the other attachment piece 412 is fastened to the one fastening portion 35, the tolerance associated with the external dimensions of the relay 41 can be efficiently absorbed, thus making it possible to reliably fix the relay 41.

In the present embodiment, the fixation member 3 that fixes the relay 41 to the casing 2 of the electrical junction box 1 is provided on the upper case 21. However, the present disclosure is not limited thereto. The fixation member 3 may be provided on the lower case 22, and the wall members 31 of the fixation member 3 may be formed as a portion of the inner wall of the lower case 22. Alternatively, the fixation member 3 may be formed separately from the upper case 21 and the lower case 22, and may be, for example, fitted between the upper case 21 and the lower case 22 by being sandwiched therebetween when the opening of the upper case 21 is closed by the lower case 22.

It should be appreciated that the embodiments disclosed herein are to be construed in all respects as illustrative and not limiting. The scope of the present disclosure is defined by the claims, rather than the description of the embodiment above, and is intended to include all modifications which fall within the scope of the claims and the meaning and scope of equivalents thereof.

What is claimed is:

1. An electrical junction box that is to be mounted in a vehicle, comprising:
    a casing that forms an outer shell;
    a fixation member including a plurality of wall members, the fixation member fixing, to the casing, an electric component that is to be electrically connected to a vehicle-mounted load or an electricity storage device mounted in the vehicle, the plurality of wall members surrounding at least a portion of an outer peripheral surface of the electric component,
    wherein a slit for absorbing a tolerance associated with external dimensions of the electric component, the slit is provided in each of adjacent two wall members of the plurality of wall members; and
    wherein the fixation member includes a fastening portion that fastens the electric component, and the fastening portion is provided at a corner portion formed by the adjacent two wall members.

2. The electrical junction box according to claim 1, wherein a rib extending along the slit is provided on a surface of the wall member in which the slit is provided, on the electric component side, and
    the rib extending along the slit comes into contact with the outer peripheral surface of the electric component.

3. The electrical junction box according to claim 1, wherein a reinforcing portion that covers a portion of the slit is provided on a surface of the wall member in which the slit is provided, on a side opposite to the electric component.

4. The electrical junction box according to claim 1, wherein the casing includes a box member having an opening, and
    the plurality of wall members are inner walls provided inside the box member.

5. The electrical junction box according to claim 2, wherein a reinforcing portion that covers a portion of the slit is provided on a surface of the wall member in which the slit is provided, on a side opposite to the electric component.

6. The electrical junction box according to claim 1, wherein the casing includes a box member having an opening, and
    the plurality of wall members are inner walls provided inside the box member.

7. The electrical junction box according to claim 2, wherein the casing includes a box member having an opening, and
    the plurality of wall members are inner walls provided inside the box member.

8. The electrical junction box according to claim 3, wherein the casing includes a box member having an opening, and
    the plurality of wall members are inner walls provided inside the box member.

* * * * *